United States Patent Office 2,890,120
Patented June 9, 1959

2,890,120

INACTIVATION OF ENZYMES IN PLANT TISSUE

Rachel U. Makower, El Cerrito, Calif., assignor to the United States of America as represented by the Secretary of Agriculture No Drawing. Application June 19, 1957
Serial No. 666,794

11 Claims. (Cl. 99—154)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preservation of edible plant material, such as fruits and vegetables, and is particularly concerned with the treatment of the plant material to inactivate the enzymes therein. The objects of the invention include the provision of processes whereby raw edible plant material is treated with certain agents to inactivate the enzymes naturally contained therein whereby the plant material can be further processed and stored with maintenance of its original characteristics of color, texture, odor and flavor. Further objects and advantages of the invention will be evident from the following description.

It is well known that when most fruits and vegetables are subjected to disorganization of their natural structure as by peeling, cutting, comminuting, pitting, pulping, freezing, etc., the produce suffers deteriorative changes including the development of dark and unnatural colors (browning), softening of tissue and development of unnatural odor and taste. These deleterious changes are attributed to various chemical reactions catalyzed by the enzymes naturally present in the plant material. The disorganization of the natural structure disrupts the natural segregation of substrates and enzymes and thus permits the enzymes to contact various substrates with the results noted above. In any preservation process whether it involves dehydration, freezing, cold storage, canning, or any combination of these, one must provide some means for controlling enzymic reactions if an acceptable product is to be produced.

Various techniques are presently used for preventing or inhibiting enzyme activity. For example, it is common in the industry to subject raw fruit or vegetables to blanching with steam or hot water whereby to inactivate the enzymes. This treatment is generally effective but has the disadvantage that the produce is at least partly cooked so that it no longer tastes like the fresh food and the blanching may also cause leaching out of valuable nutrient materials. The use of sulphur dioxide and other sulphiting agents to inactivate enzymes is also well known in the industry. Use of these reagents however has the disadvantage that the flavor of the food is adversely affected. The instant invention has among its advantages the fact that enzyme inactivation is accomplished without application of heat and without application of sulphur dioxide or other sulphiting agents.

In general according to the present invention, raw edible plant material which is normally subject to enzymic deterioration is subjected to a treatment which effectively inactivates the enzymes. This treatment involves contacting the plant tissue with an aqueous solution containing an acid, a volatile oxygenated organic solvent, and a wetting agent. The contacting of the tissues with the solution may involve dipping the tissue in the solution or spraying the solution onto the tissue. Moreover, techniques such as vacuum impregnation may be employed to ensure deep penetration of the solution into pieces of the plant tissue.

As an illustrative example of the process of the invention, raw vegetable material is contacted with an aqueous solution containing 47% alcohol, 0.01% of an alkyl ($C_{12}$–$C_{18}$) benzene sodium sulphonate, and sufficient hydrochloric acid to give the solution a pH of 1.5. In this treatment, the hydrochloric acid contacts the enzymes in the plant tissue and inactivates them. The sulphonate and alcohol enable the acidic solution to enter into the tissue and penetrate through cell walls and membranes so that the acid can actually contact the endocellular enzymes. Moreover, it is believed that the acid, sulphonate, and alcohol cooperate with a synergistic effect in inactivating the enzymes.

Although hydrochloric acid is preferred as the acid component of the treating solution, one may use other non-toxic acids which exhibit an ionization constant of at least $1 \times 10^{-3}$ and which do not display oxidizing or reducing activity at the concentrations involved. Thus for example, instead of hydrochloric acid one may employ sulphuric or phosphoric acid. Acids such as sulphurous and nitric which exhibit reducing and oxidizing action, respectively, are not included within the scope of the invention.

In preparing the treating solution, sufficient of the selected acid, as above described, is added so that the solution has a pH not higher than 3, preferably about 1 to 2. To prevent damage to the plant tissue the concentration of acid in the solution should not exceed about 1 Normal.

Alcohol is preferably employed as the organic solvent in the acid solution because of its low toxicity. Other solvents can be used, however, especially in situations where the treated plant tissue is subsequently subjected to dehydration. In such case any residual solvent in the plant tissue will be vaporized and hence removed. Accordingly, instead of alcohol one may employ other volatile oxygenated solvents such as propyl alcohol, isopropyl alcohol, acetone, and ether. All of these agents act similarly to alcohol in enabling penetration of the acid solution through cell walls and membranes and acting synergistically with the other components of the solution to promote enzyme inactivation. The proportion of organic solvent in the solution may be varied widely, i.e., from about 5 to about 70%. In the case of alcohol, a proportion of about 50% is preferred. A similar proportion is preferred with propyl alcohol, isopropyl alcohol, and acetone. In the case of ether, enough is added to saturate the solution (about 8%).

With regard to the wetting agent, only a trace is needed, that is, a proportion on the order of 0.005% to 0.05%. The nature of the wetting agent is not critical and one may employ any conventional agent which exhibits surface active properties. As well known in the art a multitude of such materials are available including the alkyl ($C_8$–$C_{18}$) sulfates, the alkyl ($C_8$–$C_{18}$) sulphonates, the alkyl ($C_8$–$C_{18}$) aromatic sulphonates, the mono- or dialkyl ($C_6$–$C_{18}$) esters of sulphosuccinic acid, sulphonated or sulphated amides of the higher fatty acids such as N-sulphoethyl stearamide, and so forth. Examples of particular agents which may be employed are sodium dodecyl sulphate, sodium tridecyl sulphate, sodium tetradecyl sulphate, sodium pentadecyl sulphate, sodium hexadecyl sulphate, sodium heptadecyl sulphate, sodium octadecyl sulphate, sodium oleyl sulphate, sodium dodecyl sulphonate, sodium tridecyl sulphonate, sodium tetradecyl sulphonate, sodium pentadecyl sulphonate, sodium hexadecyl sulphonate, sodium heptadecyl sulphonate, sodium octadecyl sulphonate, sodium oleyl sulphonate, sodium octylbenzene sulphonate, sodium decylbenzene sulphonate, sodium dodecylbenzene sulphonate, sodium tetradecylbenzene sulphonate, sodium hexadecylbenzene sulphonate, sodium octadecylbenzene sulphonate, sodium tri(isopropyl) benzene sulphonate, sodium tri(isobutyl) benzene sulphonate, sodium salt of dihexyl sulphosuccinate, sodium salt of dioctyl sulphosuccinate, and the like. The commercially available agents are often not pure compounds but mixtures of homologous compounds and are quite satisfactory for the purpose of the invention. Thus for example the sodium alkyl benzene sulphonate wherein the alkyl group contains 12 to 18 carbon atoms is a well known wetting agent. Others are a mixture of sodium alkyl sulphates consisting mostly of sodium lauryl sulphate and a mixture of sodium alkyl sulphonates wherein the alkyl group contains about 10 to 18 carbon atoms. Instead of the anionic type of agents listed above, one can employ non-ionic agents as typified by the reaction products of ethylene oxide the fatty acids, mono-, or polyhydric alcohols. Such esters and ethers are illustrated by the formulas $$RCOO(-C_2H_4O)_n-H$$

$$RO(-C_2H_4O)_n-H$$

wherein RCOO and RO represent, respectively, the residue of a long-chain fatty acid or the residue of a mono- or polyhydric alcohol such as dodecyl alcohol, glycerine, sorbtol, etc., and $n$ is an integer from about 4 to 40. Specific compounds in this category are polyoxyethylene stearate, polyoxyethylene ethers of sorbitol, polyoxyethylene ethers of dodecyl alcohol, etc. Other agents in this group are the reaction products of ethylene oxide with fatty acid esters of polyhydric alcohols, for example, a polyoxyethylene ether of sorbitan monolaurate contain 16 oxyalkylene groups per molecule, a polyoxyethylene ether of sorbitan monostearate containing 20 oxyethylene groups per molecule, etc. It is evident from the above that the specific character of the agent is not critical and any wetting agent can be used in the process.

The mode of applying the solution to the plant material may be varied depending on the desired degree of penetration of the solution into pieces of plant material. For example, if it is desired to inactivate the enzymes in the surface layers of the tissue, then one may apply the solution by dipping the plant material into the solution or by spraying the solution onto the material. Such technique is employed particularly in cases where the product is to be preserved for relatively short periods of time and the enzymes deep within the pieces are in their natural organization and hence cannot exert deleterious effects. The treatment in such instances is particularly required at the surface where the natural cell structure has been disrupted by peeling, cutting, etc. Application by dipping or spraying is also suitable where the pieces of plant tissue are of small dimensions so that the solution can penetrate throughout the tissue in a short time. In situations where the produce being treated is in larger pieces or where it is intended that complete enzyme inactivation be accomplished for keeping the products indefinitely, then it is preferred to effectuate the treatment by vacuum impregnation. This technique, as well known in the art in other applications, involves immersing the plant material in the treatment solution and subjecting the system to vacuum to draw air or other gases out of the tissue. The vacuum is then released whereby the solution enters into the innermost recesses of the plant tissue. To obtain utmost contact between the solution and the enzymes in the tissue, the vacuum treatment may be repeated several times.

After the plant tissue has been contacted with the solution as described herein, it may be treated with a neutralizing solution. This neutralization is not essential but is generally preferred. For this purpose the treated plant tissue is dipped, sprayed, or impregnated with an aqueous solution of a mild alkaline material such as sodium bicarbonate, sodium carbonate, or mixtures of the two. The proportion of the alkaline agent in the solution is adjusted to approximately neutralize the acid in the prior treatment solution. For example, if the treatment solution was 0.1 N with respect to hydrochloric acid, the neutralizing solution would be approximately 0.1 N sodium carbonate or the equivalent amount of sodium bicarbonate. The neutralizing solution may be applied to the plant tissue by the use of a vacuum impregnation technique as above described. It is to be noted that the neutralizing treatment does not vitiate the effect of the previous acid treatment because the neutralizing solution only acts to neutralize free acid in the plant tissue; it does not neutralize that portion of the acid which has become attached to enzyme molecules by salt formation or other chemical or physical manifestation. Regardless of any theoretical considerations, it has been found by actual experimentation that certain irreversible changes occur when the acid treatment is carried out which are not altered by the subsequent treatment with the alkaline solution.

Finally, if desired the plant tissue may be washed with water to remove salts which are formed by interaction of residual acid solution with the alkaline solution. The above-described vacuum impregnation technique may be employed to obtain optimum salt removal. In cases where the presence of the salt is not objectionable, this step would be omitted.

The plant tissue may then be subjected to any desired preservation treatment employing conventional techniques for such purpose as for example freezing, dehydration, brining, canning, or various combinations of these such as dehydrofreezing or dehydrocanning. Where the products are to be kept for relatively short periods of time in the raw state, they may be kept in cold storage (about 32–50° F.). Such treatment is adapted for instance, in the production of pre-peeled fresh potatoes for use as a stock for preparing various potato dishes by restaurants, hotels, etc. To this end potatoes are peeled, subjected to dipping in the solution herein described, packaged in cellophane bags and preserved at about 32–50° F. during distribution and storage. Such products are of course not intended to keep indefinitely but only for about 7 to 12 days.

The invention is applicable to any type of edible plant material as for example, potatoes, sweetpotatoes, carrots, peas, beans, cabbage, cauliflower, squash, spinach, broccoli, asparagus, artichokes, mushrooms, peaches, pears, apples, nectarines, apricots, figs, dates, etc. To assist in obtaining good penetration of the treating agents the produce is initially reduced into small pieces as by dicing, slicing, shredding, or the like. Such comminution is especially desirable in the processing of the larger-sized items such as white or sweetpotatoes, cabbage, cauliflower, and the like.

The invention is further demonstrated by the following illustrative examples:

EXAMPLE I (A) Two hundred grams of shredded fresh cabbage was placed in vessel provided with a removable head and means by which the vessel could be evacuated. Over the cabbage was poured 600 ml. of a solution made by taking a 0.1 N aqueous hydrochloric acid and adding thereto sufficient alcohol and wetting agent to establish a concentration of 47% and 0.01%, respectively, of these materials. The wetting agent was a commercial product consisting chiefly of a sodium alkyl ($C_{12}$–$C_{18}$) benzene sulphonate. The vessel was closed and evacuated and after a vacuum had been established it was broken by allowing air to enter the system. Application of vacuum and restoration of atmospheric pressure were repeated two more times. The total time for the impregnation treatment was 10 minutes.

The impregnated cabbage was washed with water and then vacuum impregnated with an aqueous solution of sodium carbonate (0.05 M). In this impregnation, vacuum and subsequent restoration of atmospheric pressure were carried out two times. Finally, the cabbage was vacuum impregnated with plain water employing two vacuum treatments followed by restoration of pressure.

Samples of the treated cabbage were then tested for the presence of active enzymes. Negative tests for peroxidase, catalase, and acetylesterase were obtained. A positive test for phosphatase was obtained but the amount of active phosphatase was very slight.

(B) The treated cabbage was then dehydrated under vacuum from the frozen state. The enzyme tests were repeated on the dehydrated cabbage and negative tests were obtained for peroxidase, catalase, acetylesterase, and phosphatase. The negative test for phosphatase after dehydration also incidated that the amount of this enzyme in the treated cabbage (before dehydration) was negligible.

*Control experiments*

In a series of control experiments, samples of the same fresh shredded cabbage were vacuum impregnated with each of the treatment agents, acid, alcohol, and wetting agent, by itself. In each case these separate agents were applied in the same concentration as in the treatment solution in Example I, part A. It was found that none of the agents were effective by themselves in that the three treated products all contained active catalase, peroxidase, acetylesterase, and phosphatase.

EXAMPLE II

The procedure of Example IA was repeated substituting diced raw celery for the shredded cabbage. It was found that the treated celery gave negative tests for peroxidase, catalase, acetylesterase, and phosphatase.

Having thus described my invention, I claim:

1. A process comprising treating raw edible plant material normally subject to enzymic deterioration with an aqueous solution of an acid selected from the group consisting of hydrochloric acid, sulphuric acid, and phosphoric acid, in a quantity sufficient to give the solution a pH not higher than 3 and in a concentration not to exceed about 1 normal, about 5 to 70% of a volatile oxygenated solvent selected from the group consisting of ethanol, propanol, isopropanol, acetone, and ether, and a trace of a wetting agent, said aqueous solution being free from any sulphiting agent, whereby to inactivate enzymes in the plant tissue.

2. The process of claim 1 wherein the acid is hydrochloric acid.

3. The process of claim 1 wherein the acid is sulphuric acid.

4. The process of claim 1 wherein the acid is phosphoric acid.

5. The process of claim 1 wherein the oxygenated solvent is alcohol.

6. The process of claim 1 wherein the oxygenated solvent is propyl alcohol.

7. The process of claim 1 wherein the oxygenated solvent is isopropyl alcohol.

8. The process of claim 1 wherein the oxygenated solvent is acetone.

9. The process of claim 1 wherein the oxygenated solvent is ether.

10. A process comprising impregnating raw edible plant material normally subject to enzymic deterioration with an aqueous solution containing hydrochloric acid in a quantity sufficient to give the solution a pH of about 1 to 2, and in a concentration not to exceed about 1 Normal, about 50% of alcohol, and a trace of wetting agent, said aqueous solution being free from any sulphiting agent, whereby to inactivate the enzymes in the plant tissue.

11. The process of claim 10 wherein the impregnated plant material is impregnated with an aqueous solution containing a concentration of alkaline material approximately stoichiometrically equivalent to the concentration of acid in the first impregnating solution, and the so-treated plant material is water-washed.

References Cited in the file of this patent
UNITED STATES PATENTS

| | | |
|---|---|---|
| 2,011,465 | Balls et al. | Aug. 13, 1935 |
| 2,434,388 | Brehm | Jan. 13, 1948 |
| 2,506,793 | Kalmar | May 9, 1950 |
| 2,700,613 | Smith et al. | Jan. 25, 1955 |

OTHER REFERENCES

"Chemistry and Methods of Enzymes," Sumner et al., third edition, 1953, pages 21–23.